July 21, 1925. Re. 16,120

V. HONSTAIN

TOOTH FOR EXCAVATING SHOVELS

Original Filed Sept. 22, 1924.

Inventor:
Vernon Honstain.
By Whiteley and Ruckman
Attorneys.

Reissued July 21, 1925. Re. 16,120

UNITED STATES PATENT OFFICE.

VERNON HONSTAIN, OF MINNEAPOLIS, MINNESOTA.

TOOTH FOR EXCAVATING SHOVELS.

Original No. 1,527,189, dated February 24, 1925, Serial No. 739,045, filed September 22, 1924. Application for reissue filed April 25, 1925. Serial No. 25,923.

*To all whom it may concern:*

Be it known that I, VERNON HONSTAIN, a citizen of the United States, residing at Minneapolis, in the county of Hennepin and State of Minnesota, have invented certain new and useful Improvements in Teeth for Excavating Shovels, of which the following is a specification.

My invention relates to teeth for excavating shovels and an object is to provide a tooth consisting of a body member and a point, these two parts being so constructed that the point may be readily and securely attached to the body member in reverse position.

The full objects and advantages of my invention will appear in connection with the detailed description thereof and the novel features of my inventive idea will be particularly pointed out in the claims.

In the accompanying drawings, which illustrate the application of my invention,—

Figure 1:
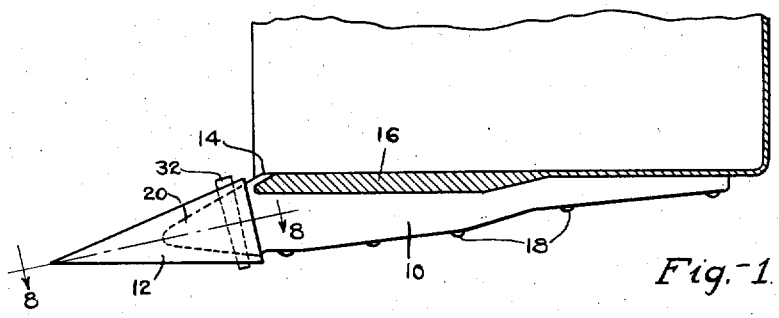
Figure 2:
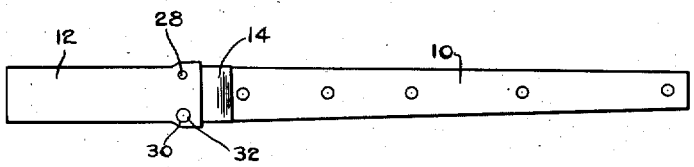
Figure 3:
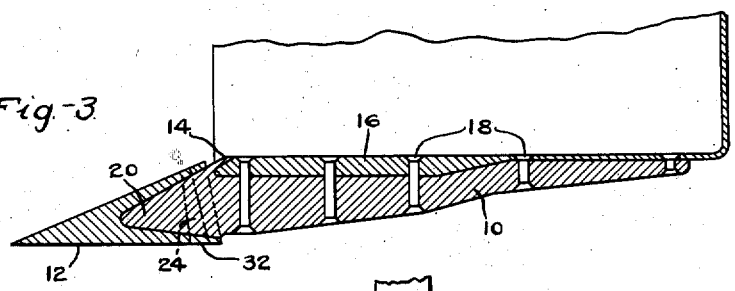
Figure 4:
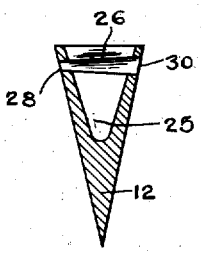
Figure 5:
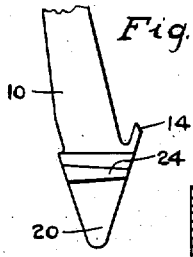
Figure 6:
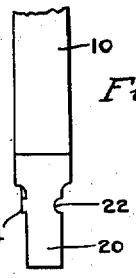
Figure 7:
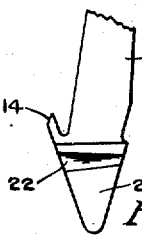
Figure 8:
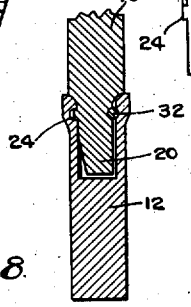

Fig. 1 is a side elevational view of the device attached to a wall of an excavating tooth, the shovel being shown partly broken away and in section. Fig. 2 is a top plan view. Fig. 3 is a vertical sectional view. Fig. 4 is a longitudinal sectional view of the point detached. Fig. 5 is a side elevational view of the forward portion of the body member. Fig. 6 is a plan view of the forward portion of the body member. Fig. 7 is a side elevational view of the side opposite that shown in Fig. 5. Fig. 8 is a view in section on the line 8—8 of Fig. 1.

As shown in the drawings a tooth comprises a body member 10 and a detachable reversible point 12. The member 10 on its upper side is provided with a rearwardly inclined lug 14 and adapted to fit over the forward lip or edge of the wall 16 of the shovel and the upper surface of the member 10 is shaped to fit the wall 16 to which it is securely fastened by rivets 18. The body member 10 at its forward end is provided with a wedge-shaped nose 20 having upper and lower inclined surfaces, the lug 14 forming a continuation of the upper surface. The two side surfaces of the body member are parallel and one of them is provided with a half round tapered recess 22 and the other side is provided with a rib 24 which provides a locking shoulder. The point 12 is wedge-shaped and is provided with a chamber 25 into which the nose 20 fits. The chamber 25, as will be apparent from Figs. 1, 2, 3 and 4, is open only at the rear of the point. The point is stronger and is held more securely upon the nose than would be the case if the sides of the point were open. The rib 24 is considered necessary to properly hold the point in place on the nose unless the length of the chamber 25 is more than one-half the length of the point. The interior of the side walls of the point at the rear are provided with half round tapered recesses 26, the taper of one recess being opposite to that of the other. The recesses 26 continue through the upper and lower surfaces of the point to form round openings 28 and 30, the opening 30 being larger than the opening 28 on account of the taper of the recesses. A tapered pin 32 is provided to fit the tapered recesses 22 and 26 when these recesses register with each other.

The operation and advantages of my invention will now be obvious. The inclined lug 14 aids in holding the body member 10 securely on the wall 16 of the shovel. When the point 12 is applied to the nose 20 of the body member the rear edge of the recess 26 on one side of the point slides past the rib 24 and has a locking engagement with the shoulder on the rib, as will be apparent from Fig. 8. The recess 26 on the other side of the point comes into register with the recess 22 and the point is firmly secured by driving the pin 32 into these registered recesses. The force exerted by driving in the pin causes the recess on the other side of the point to be securely locked with the rib 24. When the point 12 becomes worn on its lower side the pin 32 is removed, point 12 is detached and then replaced in reverse position. The provision of the two oppositely-inclined recesses 26 on opposite sides of the point permits this reversal.

I claim:

1. A tooth of the class described comprising a body member having a wedge-shaped nose, said nose having an open sided recess formed in the exterior surface of one of its sides, a wedge-shaped point containing a chamber into which said nose is adapted to fit, said point having an open sided recess formed in the interior surface of one of its sides and complementary to said first mentioned recess, and a pin adapted to pass thru the opening produced when said recesses are registered with each other.

2. A tooth of the class described comprising a body member having a wedge-shaped nose, a wedge-shaped point containing a chamber into which said nose is adapted to fit, said nose having a rib on one of its sides and a recess on its opposite side, said point having recesses in its opposite sides adapted for locking engagement with said rib, and also for registering with said first recess, and a pin adapted to pass through the recesses when registered with each other.

3. A tooth of the class described comprising a body member having a wedge-shaped nose, a wedge-shaped point containing a chamber into which said nose is adapted to fit, said nose having a rib on one of its sides and a tapered recess on its other side, said point having reversely tapered recesses in its opposite sides adapted for locking engagement with said rib and also for registering with said first recess, and a tapered pin adapted to pass through the recesses when registered with each other whereby said point may be reversely attached to said body member.

In testimony whereof, I hereunto affix my signature.

VERNON HONSTAIN.